United States Patent [19]

Uehara

[11] Patent Number: 5,088,085
[45] Date of Patent: Feb. 11, 1992

[54] MAGNETO-OPTIC DISK UNIT HAVING MEANS FOR PREVENTING ERRONEOUS INSERTION OF DISK CARTRIDGE

[75] Inventor: Keiji Uehara, Iruma, Japan
[73] Assignee: Teac Corporation, Tokyo, Japan
[21] Appl. No.: 511,643
[22] Filed: Apr. 20, 1990
[30] Foreign Application Priority Data
Apr. 21, 1989 [JP] Japan ................ 1-47365[U]
[51] Int. Cl.$^5$ ............................................. G11B 33/02
[52] U.S. Cl. .................................. 369/77.2; 369/77.1; 360/99.06
[58] Field of Search ............. 369/77.1, 77.2, 79, 369/13, 53, 127, 291, 292; 360/99.02, 99.06

[56] References Cited

U.S. PATENT DOCUMENTS

| 4,603,362 | 7/1986 | Sendelweck | 360/99.06 |
| 4,719,526 | 1/1988 | Okita | 369/77.2 |
| 4,731,776 | 3/1988 | Ishii | 369/77.2 |
| 4,878,139 | 10/1989 | Hasegawa | 360/99.06 |

FOREIGN PATENT DOCUMENTS

| 0143466 | 9/1983 | Japan | 369/291 |
| 0246957 | 11/1986 | Japan | 360/99.06 |
| 0110682 | 5/1987 | Japan | 369/77.1 |
| 0009072 | 1/1988 | Japan | 360/99.02 |
| 229659 | 9/1988 | Japan | 369/292 |
| 0146158 | 6/1989 | Japan | 369/292 |

Primary Examiner—David Trafton
Assistant Examiner—John Pokotylo
Attorney, Agent, or Firm—Michael N. Meller

[57] ABSTRACT

A magneto-optic disk unit includes a cartridge holder having an insertion opening, an inside surface and first and second surfaces, an erroneous insertion preventing mechanism having at one end a stopper portion for prohibiting erroneous insertion of a magnetic disk cartridge and at the other end an insertion detecting portion for detecting insertion of a magneto-optic disk cartridge, and a supporting mechanism for rotatably supporting the erroneous insertion preventing mechanism. The insertion detecting portion projects inside of the cartridge holder from an upper surface of the cartridge holder, so that when the magneto-optic disk cartridge is inserted the insertion detecting portion moves outside of the cartridge holder to allow insertion of the magneto-optic disk cartridge, and that when the magnetic disk cartridge is inserted the insertion detecting portion does not substantially move, thus permitting the stopper portion to prevent insertion of the magnetic disk cartridge.

8 Claims, 8 Drawing Sheets

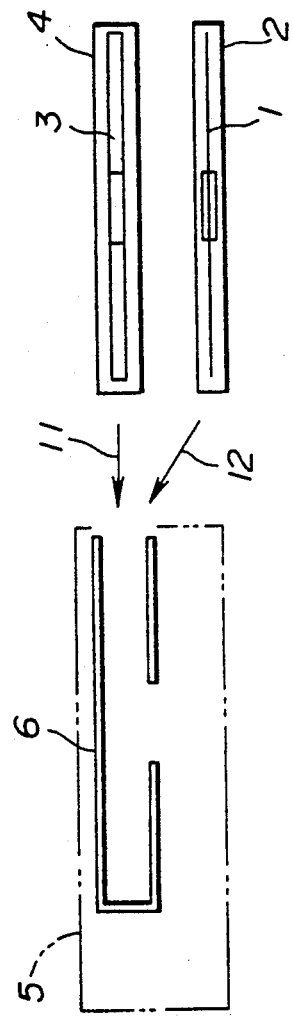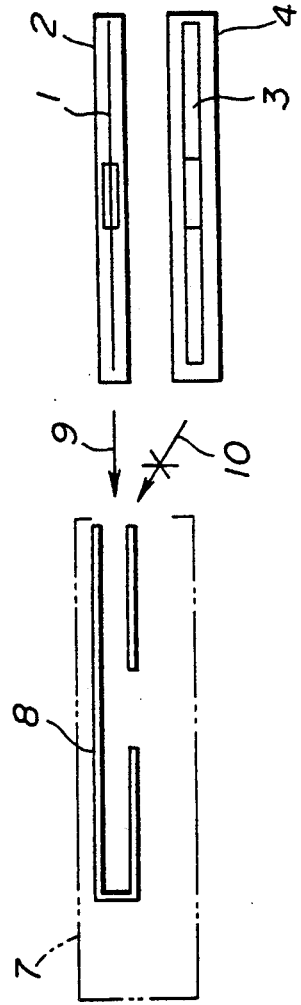

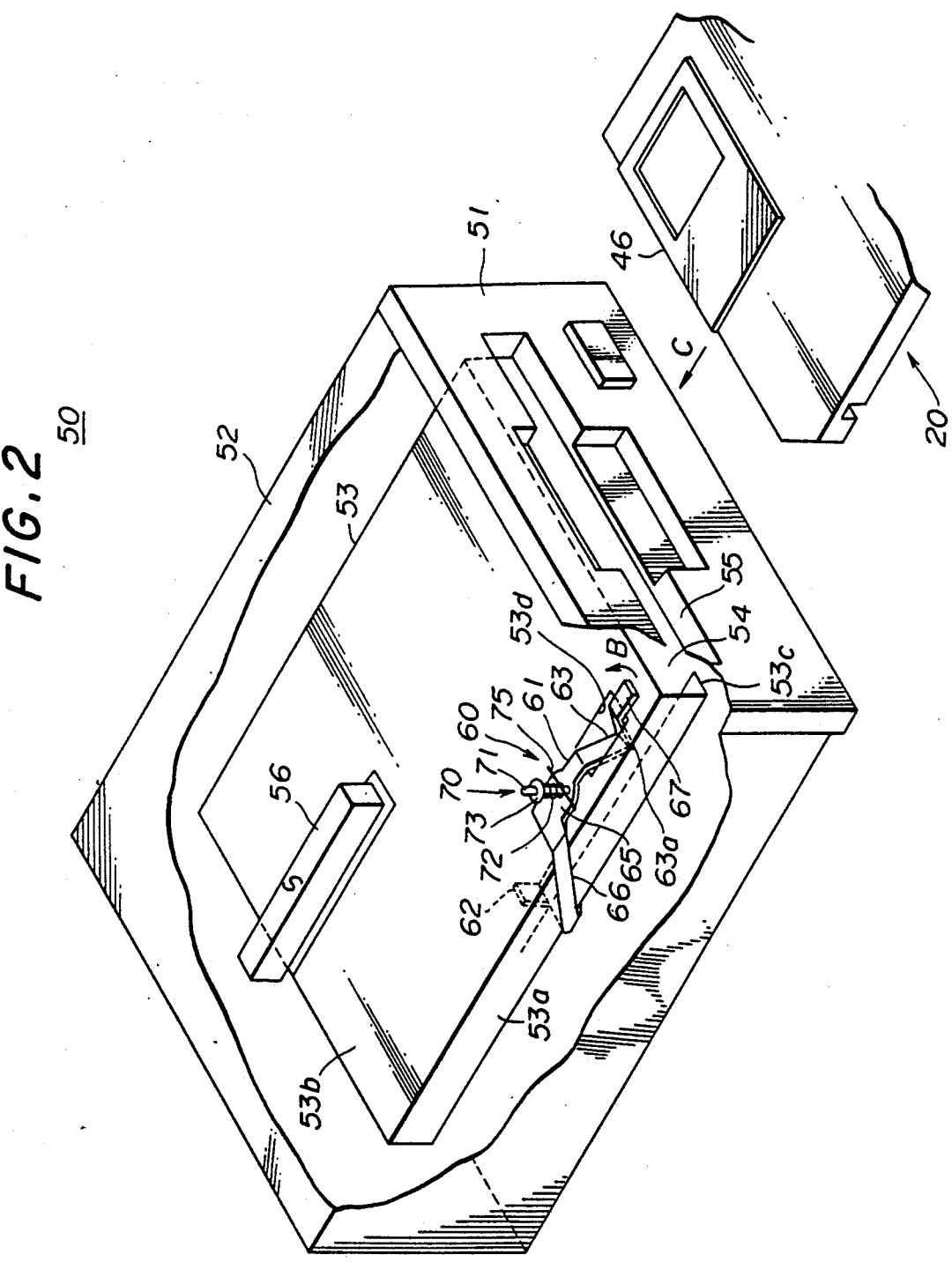

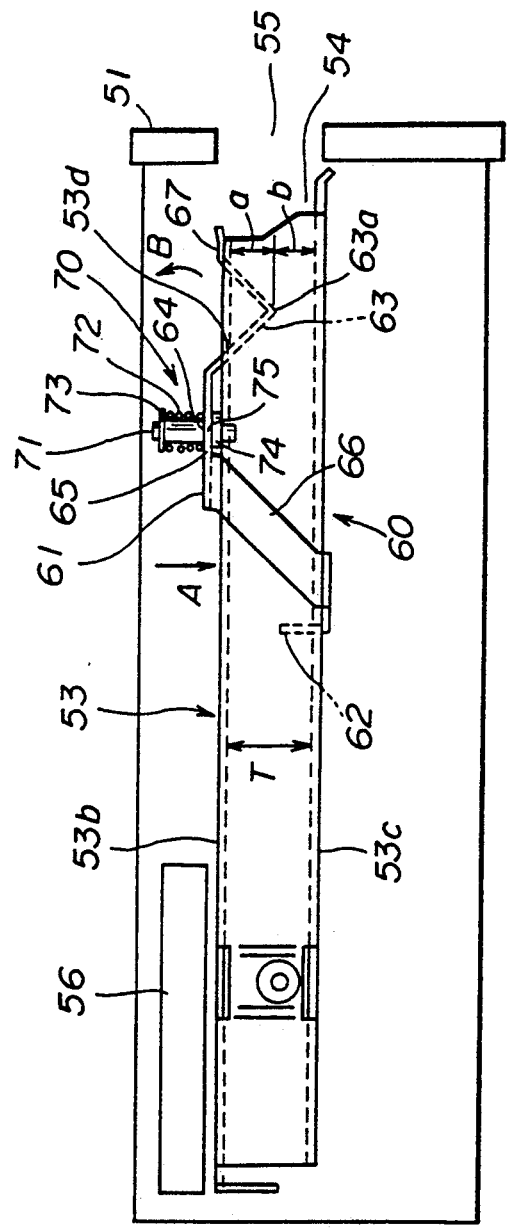

MAGNETO-OPTIC DISK UNIT HAVING MEANS FOR PREVENTING ERRONEOUS INSERTION OF DISK CARTRIDGE

BACKGROUND OF THE INVENTION

The present invention generally relates to magneto-optic disk units, and more particularly to a magneto-optic disk unit which plays a cartridge type magneto-optic disk.

Presently, a magneto-optic disk unit which is designed to play a cartridge type magneto-optic disk is being developed. Such a cartridge type magneto-optic disk is made up of a cartridge which accommodates a magneto-optic disk, similar to a cartridge type magnetic disk which is played on a magnetic disk unit. For example, when a magneto-optic disk with a 3.5-inch diameter is accommodated in a cartridge with a shutter, the external appearance of the cartridge becomes similar to that of the existing 3.5-inch magnetic disk cartridge.

Because the magneto-optic disk has a thickness greater than that of the magnetic disk, the magneto-optic disk cartridge is thicker than the magnetic disk cartridge. For this reason, a cartridge holder of the magneto-optic disk unit is bulky compared to a cartridge holder of the magnetic disk unit. Therefore, the magnetic disk cartridge may be erroneously inserted into the magneto-optic disk unit.

FIGS. 1A and 1B are diagrams for explaining the problems of the prior art. In FIGS. 1A and 1B, a magnetic disk 1 is accommodated within a magnetic disk cartridge 2. A magneto-optic disk 3 is accommodated within a magneto-optic disk cartridge 4. A magneto-optic disk unit 5 has a cartridge holder 6, and a magnetic disk unit 7 has a cartridge holder 8.

As shown in FIG. 1B, it is possible to insert the magnetic disk cartridge 2 into the cartridge holder 8 of the magnetic disk unit 7 as indicated by an arrow 9. But, because the magneto-optic disk cartridge 4 is thicker than the magnetic disk cartridge 2, the magneto-optic disk cartridge 4 cannot be inserted into the cartridge holder 8 of the magnetic disk unit 7 as indicated by a crossed out arrow 10.

However, as shown in FIG. 1A, both the magneto-optic disk cartridge 4 and the magnetic disk cartridge 2 can be inserted into the cartridge holder 6 of the magneto-optic disk unit 5 as indicated by arrows 11 and 12, because the thickness of the magnetic disk cartridge 2 is smaller than that of the magneto-optic disk cartridge 4.

A permanent magnet (not shown) for applying an external magnetic field is provided within the magneto-optic disk unit 5. For this reason, when the magnetic disk cartridge 2 is erroneously inserted into the cartridge holder 6 of the magneto-optic disk unit 5, the data pre-recorded on the magnetic disk 1 may be damaged or erased by the permanent magnet.

Therefore, it is necessary that the magneto-optic disk unit 5 prevent an erroneous insertion of the magnetic disk cartridge 2. However, there is a problem in that the conventional magneto-optic disk unit 5 has no means for preventing such an erroneous insertion.

SUMMARY OF THE INVENTION

Accordingly, it is a general object of the present invention to provide a novel and useful magneto-optic disk unit in which the above-described problems are eliminated.

Another and more specific object of the present invention is to provide a magneto-optic disk unit which will accommodate properly the magneto-optic disk cartridge in a horizontal position and have an erroneous insertion preventing means for positively preventing erroneous insertion of a magnetic disk cartridge.

Still another object of the present invention is to provide a magneto-optic disk unit which will accommodate properly the magneto-optic disk cartridge in a vertical position and have an erroneous insertion preventing means for positively preventing erroneous insertion of a magnetic disk cartridge.

The above-described objects and features of the present invention are achieved by a magneto-optic disk unit which comprises a cartridge holder having an insertion opening through which a disk cartridge is inserted along the insertion path, an inside portion in the cartridge insertion path, and first and second surfaces confronting respective sides of the magneto-optic disk; erroneous insertion preventing means for preventing erroneous insertion of the magnetic disk cartridge, said erroneous insertion preventing means having a stopper portion at one end and an insertion detecting portion at the other end, said stopper portion serving to prevent insertion of the magnetic disk cartridge and said insertion detecting portion having a shape and structure allowing outward movement of said insertion detecting portion from said cartridge holder when the magneto-optic disk cartridge is inserted; and supporting means for supporting rotatably said erroneous insertion preventing means, said supporting means having a spring means for urging said erroneous insertion preventing means so that said insertion detecting portion projects inside of said cartridge holder in the vicinity of said opening of the cartridge holder and said stopper portion projects inside of said cartridge holder in the vicinity of said inside portion of the cartridge holder, said erroneous insertion preventing means being rotatably supported by said supporting means on said first surface of the cartridge holder, and said insertion detecting portion having a predetermined position projecting inside of the cartridge holder from said first surface of the cartridge holder, so that when the magneto-optic disk cartridge is inserted said insertion detecting portion moves outward from said cartridge holder to allow insertion of said magneto-optic disk cartridge, and that when the magnetic disk cartridge is inserted said insertion detecting portion does not substantially move, thus permitting said stopper portion to prevent insertion of the magnetic disk cartridge.

According to the present invention, it is possible for the magneto-optic disk unit to positively prevent erroneous insertion of the magnetic disk cartridge because when the magnetic disk cartridge is inserted, the erroneous insertion preventing means does not substantially move and the stopper portion remains projecting inside to restrain the magnetic disk cartridge from entering further. Also, according to the present invention, it is possible for the magneto-optic disk unit to properly accommodate the magneto-optic disk cartridge because when the magneto-optic disk cartridge is inserted the erroneous insertion preventing means moves outward to allow outward movement of the stopper portion.

Other objects and further features of the present invention will be apparent from the following description when read in conjunction with the accompanying drawings.

BRIEF DESCRIPTION OF THE DRAWINGS

FIG. 1A is a diagram for explaining insertion of disk cartridges into a magneto-optic disk unit;

FIG. 1B is a diagram for explaining insertion of disk cartridges into a magnetic disk unit;

FIG. 2 is a perspective view of an embodiment of a magneto-optic disk unit according to the present invention with a casing partially cut away to reveal the inside of the magneto-optic disk unit;

FIG. 3 is a schematic side view of the magneto-optic disk unit shown in FIG. 2;

DESCRIPTION OF THE PREFERRED EMBODIMENTS

Figure 4A:
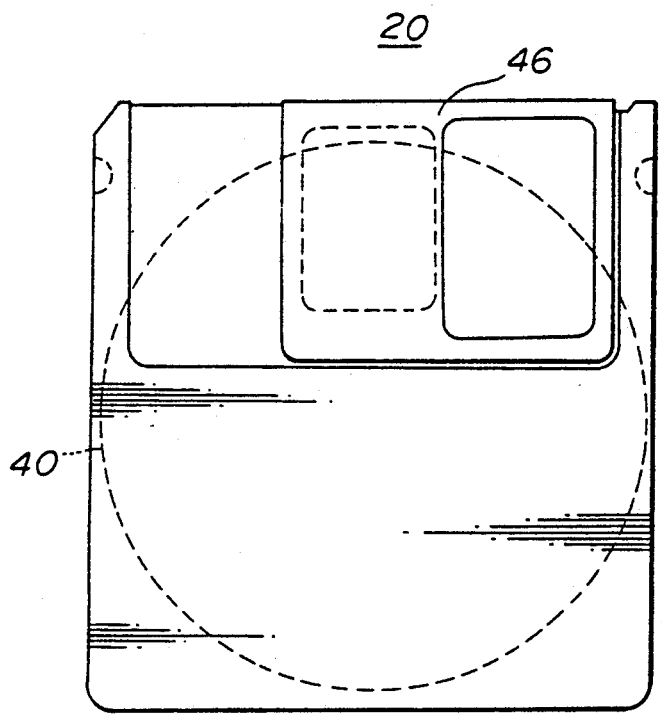
FIGS. 4A, 4B and 4C are a plan view, a side view and a bottom view of a magneto-optic disk cartridge, respectively.

First, a description will be given of a first preferred embodiment of a magneto-optic disk unit 50 according to the present invention, by referring to FIGS. 2, 3 and 4A through 4C. As shown in FIGS. 2 and 3, the magneto-optic disk unit 50 generally comprises a front bezel 51, a casing 52 and a cartridge holder 53. The cartridge holder 53 is formed by bending a metal sheet in conformity with the size of a magneto-optic disk cartridge 20, and has a side surface 53a, and top and bottom surfaces 53b and 53c confronting respective sides of a magneto-optic disk. A rectangular opening 53d is formed in the top surface 53b of the cartridge holder 53 in the vicinity of the front bezel 51.

The cartridge holder 53 is provided horizontally within the casing 52 to receive the magneto-optic disk cartridge in a horizontal position. With no disk cartridge inserted, an insertion opening 54 of the cartridge holder 53 is located at a position as high as an opening 55 of the front bezel 51 of the magneto-optic disk unit 50. When the magneto-optic disk cartridge 20 is inserted, the cartridge 20 is lowered to a place for playing a magneto-optic disk on a magneto-optic disk unit 50. A permanent magnet 56 is provided within the casing 52 for applying an external magnetic field to the magneto-optic disk during a recording/erasing mode.

Next, a description will be given of a 3.5-inch magneto-optic disk cartridge which is played on a magneto-optic disk unit according to the present invention, in comparison with a 3.5-inch magnetic disk cartridge.

Figure 4B:
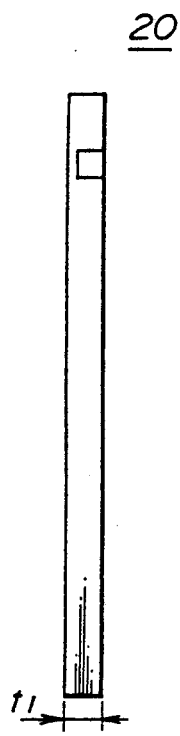
Figure 4C:
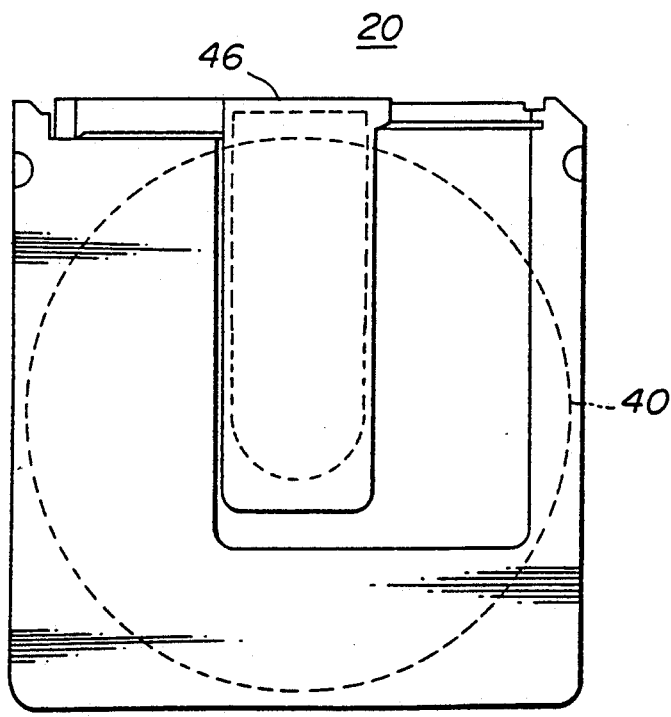
Figure 5A:
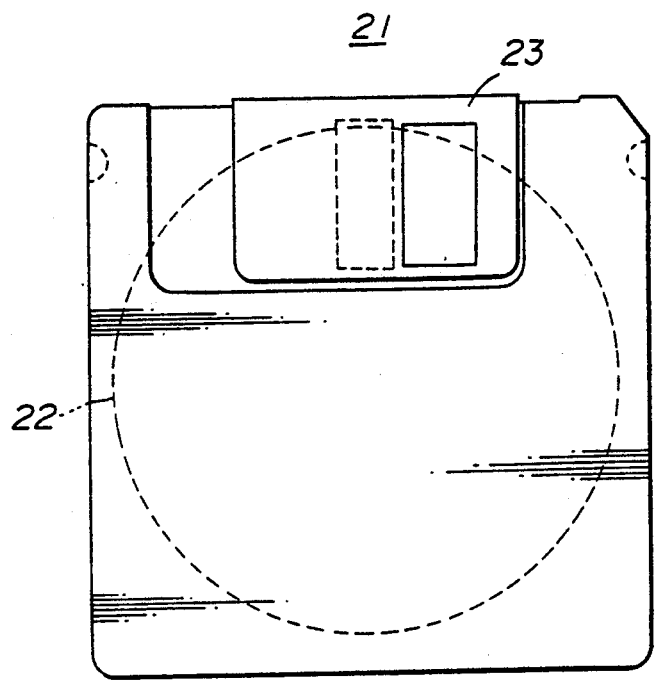
FIGS. 5A, 5B and 5C are a plan view, a side view and a bottom view of a magnetic disk cartridge, respectively.
Figure 5B:
Figure 5C:
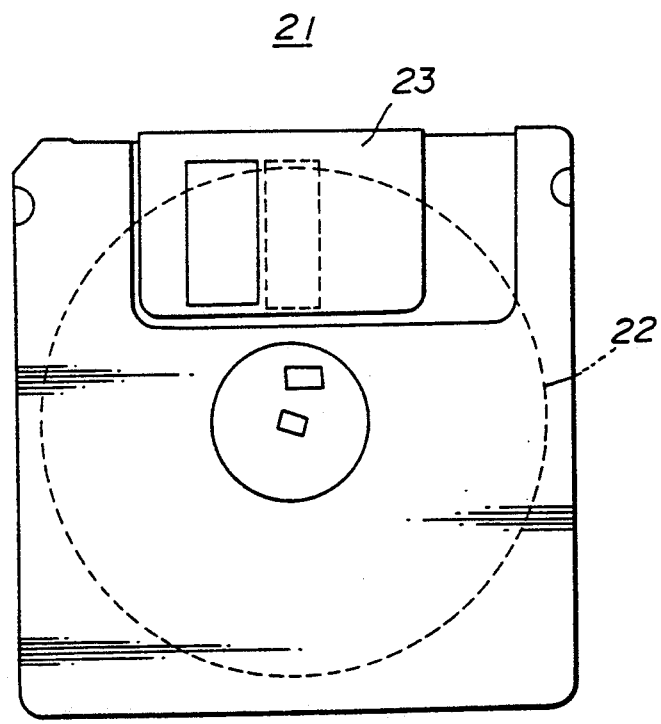

FIGS. 4A, 4B and 4C respectively are a plan view, a side view and a bottom view of a magneto-optic disk cartridge 20. The magneto-optic disk cartridge 20 accommodates a magneto-optic disk 40 and has a shutter 46. FIGS. 5A, 5B and 5C respectively are a plan view, a side view and a bottom view of a magnetic disk cartridge 21. The magnetic disk cartridge 21 accommodates a magnetic disk 22 and has a shutter 23. The magneto-optic disk cartridge 20 has a thickness t1 which is approximately twice as thick as a thickness t2 of the magnetic disk cartridge 21. The other dimensions and shape of the magneto-optic disk cartridge 20 are approximately the same as those of the magnetic disk cartridge 21.

As shown in FIG. 3, an inside dimension "T" of the cartridge holder 53 between the top and bottom surfaces 52b and 53c is equal to or slightly greater than the thickness "t1" of the magneto-optic disk cartridge 20.

An erroneous insertion preventing mechanism 60 is provided on the cartridge holder 53 at a place on the left side thereof when viewed from the insertion opening 54. An erroneous insertion preventing part 61 of the mechanism 60 has an upwardly extending stopper portion 62 at one end and an insertion detecting portion 63 at the other end. As shown in FIGS. 2 and 3, the insertion detecting portion 63 is formed into a wedge shape by bending. And the erroneous insertion preventing part 61 has a flat portion 65 including a hole 64 at a center thereof. An arm portion 66 of the erroneous insertion preventing part 61 extends obliavely from the flat portion 65 along the side surface 53a of the cartridge holder 53 to the stopper portion 62.

A supporting mechanism 70 for supporting the erroneous insertion preventing part 61 includes a pin 71, a helical compression spring 72 connected around the pin and a washer 73. The pin 71 has a base portion 74 which is embedded in the top surface 53b of the cartridge holder 53. The helical compression spring 72 is provided between the washer 73 and the flat portion 65 of the erroneous insertion preventing part 61. The flat portion 65 is placed on the base portion 74 of the pin 71, and the pin 71 goes through the hole 64 at the center of the flat portion 65. The washer 73 is fitted on an upper portion of the pin 71. Therefore, the flat portion 65 of the erroneous insertion preventing part 61 is slidable on the pin 71, and the spring 72 serves to press the erroneous insertion preventing part 61 against the base portion 74.

The wedge-shaped insertion detecting portion 63 which extends from the flat portion 65 goes across the opening 53d of the cartridge holder 53, and has a lowermost position 63a which projects inside of the cartridge holder 53 from the top surface 53b. And the insertion detecting portion 63 has an edge 67 which rests on the top surface 53b of the cartridge holder 53. As shown in FIG. 3, a dimension "a" from the lowermost position 63a of the insertion detecting portion 63 to the top surface 53a of the cartridge holder 53 is predetermined to make a remaining dimension "b" (=T−a) from the bottom surface 53c of the cartridge holder 53 to the lowermost position 63a of the insertion detecting portion 63 nearly equal to the thickness t2 of the magnetic disk cartridge 21.

The stopper portion 62 of the erroneous insertion preventing part 61 projects inside of the cartridge holder 53 from the bottom surface 53c. The erroneous insertion preventing part 61 is held in a position shown in FIGS. 2 and 3 by the helical compression spring 72 with force acting downward. And the erroneous insertion preventing part 61 is rotatably supported by the supporting mechanism 70 in a direction, as indicated by an arrow B in FIGS. 2 and 3, around a line 75 which is parallel to the direction of the insertion opening 54 and passes through a center of the pin 71. The overall dimensions of the erroneous insertion preventing part 61 are predetermined to allow outward movement of the stopper portion 62 outside of the cartridge holder 53 when the insertion detecting portion 63 moves outside of the cartridge holder 53 due to the insertion of a magneto-optic disk cartridge 20 into the magneto-optic disk unit 50.

Figure 6:
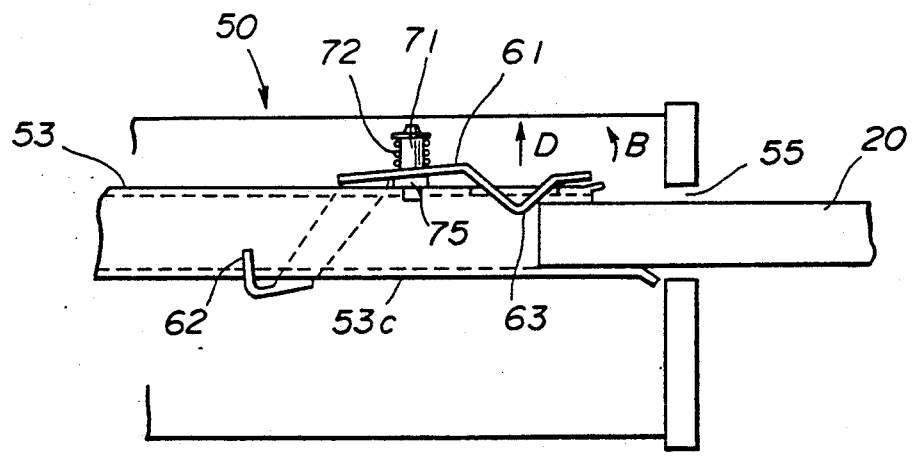
FIG. 6 is a schematic side view of the magneto-optic disk unit for explaining operation of an erroneous insertion preventing mechanism when the magneto-optic disk cartridge is initially inserted.
Figure 7:
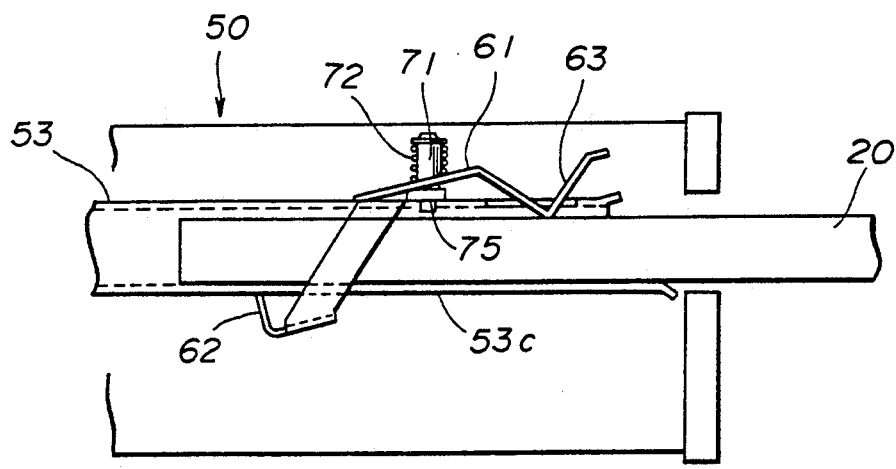
FIG. 7 is a schematic side view of the magneto-optic disk unit for explaining operation of the erroneous insertion preventing mechanism when the insertion of the magneto-optic disk cartridge is accepted.

Next, a description will be given of an operation of the erroneous insertion preventing mechanism 60, by referring to FIGS. 6 through 8.

When the magneto-optic disk cartridge 20 is inserted in a direction indicated by an arrow C in FIG. 2, a front edge of the cartridge 20 passes through the opening 55, and is placed into the cartridge holder 53 through the insertion opening 54. When inserted, the front edge of the magneto-optic disk cartridge 20 comes into contact with the insertion detecting portion 63, and the insertion detecting portion 63 is raised in a direction indicated by an arrow D in FIG. 6. This permits the erroneous insertion preventing part 61 to rotate around the line 75 in a direction indicated by an arrow B, and the stopper portion 62 moves downward to a position, as shown in FIG. 7, which is located outside of the cartridge holder 53.

With the stopper portion 62 at this position, the lowermost position 63a of the insertion detecting portion 63 is held in contact with a top surface of the magneto-optic disk cartridge 20 when the cartridge 20 passes by the wedge-shaped insertion detecting portion 63. Therefore, the magneto-optic disk cartridge 20 is inserted to a position for playing the magneto-optic disk on the magneto-optic disk unit in the vicinity of an opposite end of the cartridge holder 63 opposite to the insertion opening 54 without contacting the stopper portion 62.

Next, a description will be given of an operation of the erroneous insertion preventing mechanism 60 when the magnetic disk cartridge 21 is erroneously inserted into the opening 55 of the front bezel 51.

As described above, the external dimensions of the magnetic disk cartridge 21 are approximately the same as those of the magneto-optic disk cartridge 20 except that the thickness of the magnetic disk cartridge 21 is smaller than that of the magneto-optic disk cartridge 20. Because of this, it is possible to insert erroneously the magnetic disk cartridge 21 into the cartridge holder 53 through the opening 55.

Figure 8:
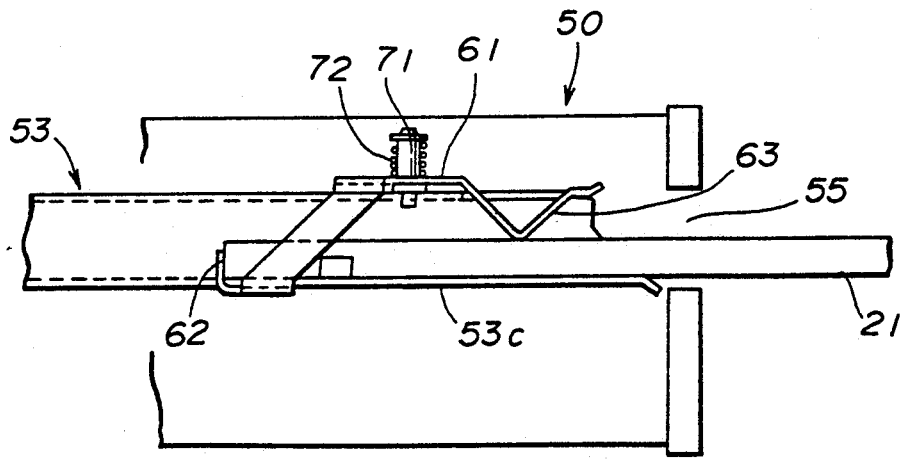
FIG. 8 is a schematic side view of the magneto-optic disk unit for explaining operation of the erroneous insertion preventing mechanism when the insertion of the magnetic disk cartridge is rejected.

As shown in FIG. 8, the magnetic disk cartridge 21 is inserted into the cartridge holder 53 with a bottom surface of the cartridge 21 being supported on the bottom surface 53c of the cartridge holder 53. Upon insertion, the cartridge 21 pushes up the insertion detecting portion 63 only slightly or not at all when the front edge of the cartridge 21 passes by the wedge-shaped insertion detecting portion 63. The stopper portion 62 remains projecting inside of the cartridge holder 53 from the bottom surface 53c. Therefore, the stopper portion 62 prevents the front edge of the cartridge 21 from further entering because the front edge of the cartridge 21 comes up against the inwardly projecting stopper portion 62, as indicated in FIG. 8.

Figure 9:
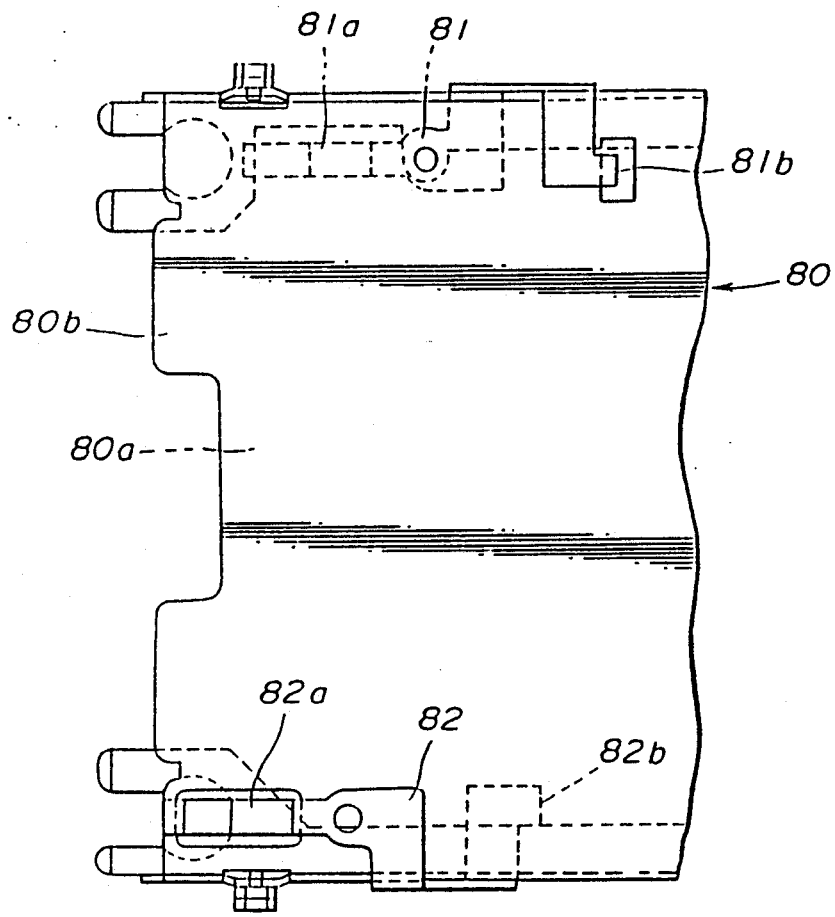
FIG. 9 is a schematic side view of an embodiment of a modified cartridge holder according to the present invention.
Figure 10:
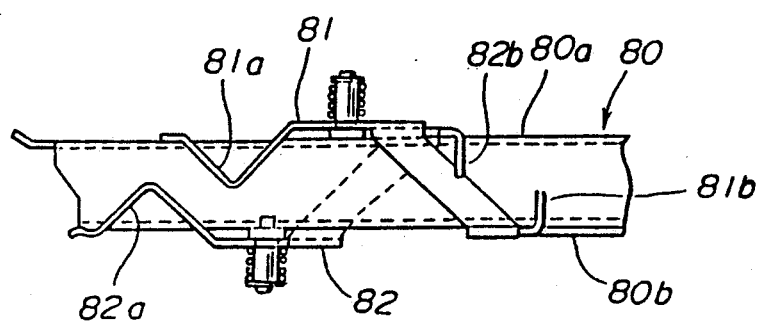
FIG. 10 is a schematic plan view of an embodiment of a modified cartridge holder according to the present invention.

FIGS. 9 and 10 show a second preferred embodiment of a magneto-optic disk unit according to the present invention.

This embodiment is desirable for a magneto-optic disk unit having a cartridge holder which is provided uprightly in the magneto-optic disk unit to receive a magneto-optic disk cartridge in a vertical position. As shown in FIGS. 9 and 10, a cartridge holder 80 is provided uprightly to allow insertion of a magneto-optic disk cartridge 20 in a vertical position. The cartridge holder 80 has first and second upright walls 80a and 80b, said first and second upright walls being opposed to each other and confronting respective sides of the magneto-optic disk when the magneto-optic disk cartridge is inserted. First and second erroneous insertion preventing parts 81 and 82 have substantially the same shape and dimensions as those of the above-described erroneous insertion preventing part 61.

The first erroneous insertion preventing part 81, as shown in FIGS. 9 and 10, is provided at an upper portion of the cartridge holder 80 and is mounted on an outside surface of the first upright wall 80a with a supporting mechanism similar to that of the first embodiment. As in the case of the above-described first embodiment, the first erroneous insertion preventing part 81 has a first insertion detecting portion 81a and a first stopper portion 81b. The first insertion detecting portion 81a projects inside of the cartridge holder 80 from the first upright wall 80a, and the first stopper portion 81b projects inside of the cartridge holder 80 from the second upright wall 80b.

The second erroneous insertion preventing part 82 is provided at a lower portion of the cartridge holder 80 and is mounted on an outside surface of the second upright wall 80b with a supporting mechanism similar to that of the first embodiment. The second erroneous insertion preventing part 82 has a second insertion detecting portion 82a and a second stopper portion 82b. The second insertion detecting portion 82a projects inside of the cartridge holder 80 from the second upright wall 80b, and the second stopper portion 82b projects inside of the cartridge holder 80 from the first upright wall 80a. As shown in FIGS. 9 and 10, the first and second erroneous insertion preventing parts 81 and 82 are at places slightly different from each other in a direction parallel to the insertion path of a disk cartridge.

In other words, the first insertion detecting portion 81a and the second stopper portion 82b project inside from the wall 80a of the cartridge holder 80, and the second insertion detecting portion 82a and the first stopper portion 81b project inside from the opposing wall 80b of the cartridge holder 80.

Because the cartridge holder 80 is provided in an upright position, the magnetic disk cartridge 21, erroneously inserted in the cartridge holder 80, is not always placed in the same insertion path, but may instead be placed in a different insertion path. The magnetic disk cartridge 21 may be inserted along the first upright wall 80a or along the second upright wall 80b.

In a case where the magnetic disk cartridge 21 is inserted along the second upright wall 80b for example, the second stopper portion 82b moves outside of the cartridge holder 80 but the first stopper portion 81b remains projecting from the second upright wall 80b.

Figure 11:
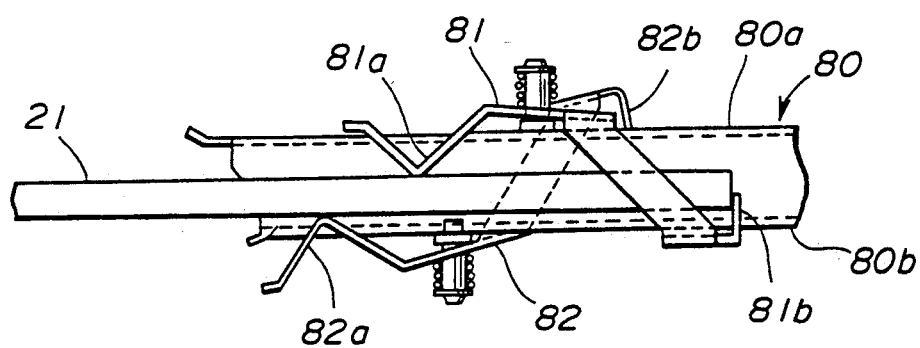
FIG. 11 is a schematic side view of the modified magneto-optic disk unit for explaining operation of the erroneous insertion preventing mechanism when the insertion of the magnetic disk cartridge is rejected.

The first stopper portion 81b prevents the magnetic disk cartridge 21 from being further inserted, as shown in FIG. 11.

Therefore, regardless of whether the magnetic disk cartridge 21 is inserted along the wall 80a or along the wall 80b, erroneous insertion of the magnetic disk cartridge 21 is prevented by either the first stopper portion 81b or the second stopper portion 82b.

When the magneto-optic disk cartridge 20 having a thickness approximately twice as large as that of the magnetic disk cartridge 21 is inserted, both the first and second insertion detecting portions 81a and 82a move outside of the cartridge holder 80 and therefore the stopper portions 81b and 82b move outside of the cartridge holder 80 to allow a normal insertion of the magneto-optic disk cartridge 20 into the cartridge holder 80.

As described in the foregoing, it is possible for the magneto-optic disk unit according to the present invention to positively prevent the magnetic disk cartridge thinner than the magneto-optic disk cartridge from being inserted, eliminating a problem in which the pre-recorded data on the magnetic disk is erroneously damaged or erased by the permanent magnet provided within the magneto-optic disk unit. And, it is possible for the magneto-optic disk unit according to the present invention, regardless of whether the cartridge holder is provided horizontally or uprightly in the magneto-optic disk unit, to accommodate properly the magneto-optic disk cartridge not only in a horizontal position but also in a vertical position, and for the magneto-optic disk unit to safely prevent the erroneously inserted magnetic disk cartridge from being damaged by the permanent magnet within the magneto-optic disk unit.

Further, the present invention is not limited to these embodiments, but various variations and modifications may be made without departing from the scope of the present invention.

What is claimed is:

1. A magneto-optic disk unit for playing a magneto-optic disk which is accommodated within a magneto-optic disk cartridge, said magneto-optic disk unit having a casing including an opening through which a disk cartridge is inserted into and extracted from said casing along a cartridge insertion path, said magneto-optic disk cartridge having a size and structure similar to that of a magnetic disk cartridge which accommodates a magnetic disk with a thickness t2 which is smaller than a thickness t1 of the magneto-optic disk cartridge, said magneto-optic disk unit comprising:

a cartridge holder having an insertion opening through which a disk cartridge is inserted along the cartridge insertion path, an inner portion located along the cartridge insertion path, and first and second surfaces confronting respective sides of the magneto-optic disk;

erroneous insertion preventing means for preventing erroneous insertion of the magnetic disk cartridge, said erroneous insertion preventing means having a stopper portion at one end and an insertion detecting portion at the other end, said stopper portion and said insertion detecting portion being rigidly connected, said stopper portion serving to prevent insertion of the magnetic disk cartridge when said erroneous insertion preventing means is in a first position and said stopper portion serving to allow insertion of the magneto-optic disk cartridge when said erroneous insertion preventing means is in a second position; and supporting means for supporting rotatably said erroneous insertion preventing means, said supporting means having a spring means for urging said erroneous insertion preventing means so that said insertion detecting portion projects inside of said cartridge holder in the vicinity of said opening of the cartridge holder and said stopper portion projects inside of said cartridge holder in the vicinity of said inner portion of the cartridge holder, said erroneous insertion preventing means being rotatably supported by said supporting means on said first surface of the cartridge holder, and said first surface of the cartridge holder, and said insertion detecting portion projects inside of the cartridge holder when said erroneous insertion prevention means is in said first position, said insertion detecting portion having a shape and structure such that when the magneto-optic disk cartridge is partially inserted said insertion detecting portion is moved outward from said cartridge holder to allow full insertion of said magneto-optic disk cartridge, and that when the magnetic disk cartridge is partially inserted said insertion detecting portion does not move enough to remove said stopper portion from said cartridge insertion path, thus permitting said stopper portion to prevent full insertion of the magnetic disk cartridge.

2. The magneto-optic disk unit as claimed in claim 1, wherein said cartridge holder is provided horizontally in said magneto-optic disk unit to allow insertion of the magneto-optic disk cartridge in a horizontal position.

3. The magneto-optic disk unit as claimed in claim 1, wherein said cartridge holder is provided uprightly in said magneto-optic disk unit to allow insertion of the magneto-optic disk cartridge in a vertical position.

4. The magneto-optic disk unit for playing a magneto-optic disk which is accommodated within a magneto-optic disk cartridge, said magneto-optic disk unit having a casing including an opening through which a disk cartridge is inserted into and extracted from said casing along a cartridge insertion path, said magneto-optic disk cartridge having a size and structure similar to that of a magnetic disk cartridge which accommodates a magnetic disk with a thickness t2 which is smaller than thickness t1 of the magneto-optic disk cartridge, said magneto-optic disk unit comprising:

a cartridge holder having an insertion opening through which a disk cartridge is inserted along the cartridge insertion path, an inner portion located along the cartridge insertion path, and first and second surfaces confronting respective sides of the magneto-optic disk;

erroneous insertion preventing means for preventing erroneous insertion of the magnetic disk cartridge, saidion located along the cartridge insertion path, and first and second surfaces confronting respective sides of the magneto-optic disk;

erroneous insertion preventing means for preventing erroneous insertion of the magnetic disk cartridge, said erroneous insertion preventing means having a stopper portion at one end and an insertion detecting portion at the other end, said stopper portion serving to prevent insertion of the magnetic disk cartridge when said erroneous insertion preventing means is in a first position and said stopper portion serving to allow insertion of the magneto-optic disk cartridge when said erroneous insertion means is in a second position; and supporting means for supporting rotatably said erroneous insertion preventing means, said supporting means having a spring means for urging said erroneous insertion preventing means so that said insertion detecting portion projects inside of said cartridge holder in the vicinity of said opening of the cartridge holder and said stopper portion projects inside of said cartridge holder in the vicinity of said inner portion of the cartridge holder, said erroneous insertion preventing means being rotatably supported by said supporting means on said first surface of the cartridge holder, and said insertion detecting porition projects inside of the cartridge holder from said first surface of the cartridge holder, when said erroneous insertion prevention means is in said first position said insertion detecting position having a shape and structure such that when the magneto-optic disk cartridge is partially inserted said insertion detecting portion is moved outward from said cartridge holder to allow full insertion of said magneto-optic disk cartridge, and that when the magnetic disk cartridge is partially inserted said insertion detecting portion does not move enough to remove said stopper position from said cartridge insertion path, thus preventing said stopper portion to prevent full insertion of the magnetic disk cartridge, wherein said cartridge holder is provided horizontally in said magneto-optic disk unit to allow insertion of the magneto-optic disk cartridge in a horizontal position, and said insertion detecting portion is formed to have a dimension perpendicular from said first surface of the cartridge holder to said predetermined position, said dimension being nearly equal to a dimension obtained by subtracting the thickness t2 of the magnetic disk cartridge from the thickness t1 of the magneto-optic disk cartridge.

5. The magneto-optic disk unit as claimed in claim 4, wherein said erroneous insertion preventing means further comprises a flat portion extending from said insertion detecting portion and an arm portion extending from said flat portion to said stopper portion, said flat portion having an opening at a center portion thereof, and said arm portion being provided across a side portion of said cartridge holder, so that said insertion detecting portion projects inside from the first surface of said cartridge holder and said stopper portion projects inside from the second surface of said cartridge holder.

6. The magneto-optic disk unit as claimed in claim 5, wherein said supporting means further comprises a pin having a base portion at one end and a washer at the other end, said base portion being fixed on said first surface of the cartridge holder, said pin being placed through said opening of said flat portion, said erroneous insertion preventing means being placed on said base portion, and said spring means being fitted around said pin between said washer and said erroneous insertion preventing means, so that said supporting means rotatably supports said erroneous insertion preventing means.

7. The magneto-optic disk unit for playing a magneto-optic disk which is accommodated within a magneto-optic disk cartridge, said magneto-optic disk unit having a casing including an opening through which a disk cartridge is inserted into and extracted from said casing along a cartridge insertion path, said magneto-optic disk cartridge having a size and structure similar to that of a magnetic disk cartridge which accommodates a magnetic disk with a thickness t2 which is smaller than a thickness t1 of the magneto-optic disk cartridge, said magneto-optic disk unit comprising:

a cartridge holder having an insertion opening through which a disk cartridge is inserted along the cartridge insertion path, an inner portion located along the cartridge insertion path, and first and second surfaces confronting respective sides of the magneto-optic disk;

first and second erroneous insertion preventing means for preventing erroneous insertion of the magnetic disk cartridge, each of said first and second said erroneous insertion preventing means having a stopper portion at one end and an insertion detecting portion at the other end, said stopper portion serving to prevent insertion of the magnetic disk cartridge when said respective erroneous insertion preventing means is in a first position and said stopper portion serving to allow insertion of the magneto-optic disk cartridge when said erroneous insertion prevention means is in a second position, and first and second supporting means for supporting rotatably said first and second erroneous insertion preventing means respectively, each of said first and second supporting means having spring means for urging said respective erroneous insertion preventing means so that said insertion detecting portion projects inside of said cartridge holder in the vicinity of said opening of the cartridge holder and said stopper portion projects inside of said cartridge holder in the vicinity of said inner portion of the cartridge holder, said first and second erroneous insertion preventing means being rotatably supported by said first and second supporting means respectively and said insertion detecting portion projects inside of the cartridge holder from said first surface of the cartridge holder when said erroneous insertion prevention means is in said first position, said insertion detecting portion having a shape and structure such that when the magneto-optic disk cartridge is partially inserted said insertion detecting portion is moved outward from said cartridge holder to allow full insertion of said magneto-optic disk cartridge, and that when the magnetic disk cartridge is partially inserted said insertion detecting portion does not move enough to remove said stopper portion from said cartridge insertion path, thus permitting said stopper portion to prevent full insertion of the magnetic disk cartridge, wherein said cartridge holder is provided uprightly in said magneto-optic disk unit to allow insertion of the magneto-optic disk cartridge in a vertical position, and said first and second erroneous insertion preventing means are provided on both the first and second surfaces of the cartridge holder, said first erroneous insertion preventing means having a first insertion detecting portion and a first stopper portion, said second erroneous insertion preventing means having a second insertion detecting portion and a second stopper portion, so that said first insertion detecting portion and said second stopper portion project inside from the first surface of the cartridge holder while said second insertion detecting portion and said first stopper portion project inside from the second surface of the cartridge holder.

8. The magneto-optic disk unit as claimed in claim 7, wherein said first erroneous insertion preventing means is provided at an upper portion of the first surface of the cartridge holder and rotatably supported by a first supporting means on the first surface, and said second erroneous insertion preventing means is provided at a lower portion of the second surface of the cartridge holder and rotatably supported by a second supporting means on the second surface.

* * * * *